United States Patent [19]
Wilson et al.

[11] Patent Number: 5,495,156
[45] Date of Patent: Feb. 27, 1996

[54] ACTUATOR RETRACTION CIRCUIT

[75] Inventors: Dean Wilson, Rutland; Brian Molloy, Cambridge, both of Mass.

[73] Assignee: Quantum Corporation, Milpitas, Calif.

[21] Appl. No.: 265,482

[22] Filed: Jun. 24, 1994

[51] Int. Cl.$^6$ .................................... H02K 7/10
[52] U.S. Cl. .................. 318/368; 318/364; 318/678; 360/70; 369/32
[58] Field of Search .................. 318/364, 678, 318/368; 360/70, 77.01; 369/32, 44

[56] References Cited

U.S. PATENT DOCUMENTS

| | | | |
|---|---|---|---|
| 4,104,684 | 8/1978 | Wakami et al. | 360/70 |
| 4,682,314 | 7/1987 | Nakagaki et al. | 369/74 |
| 4,835,754 | 5/1989 | Yamamoto et al. | 369/32 |
| 4,860,271 | 8/1989 | Yokogawa et al. | 369/44 |
| 4,885,517 | 12/1989 | Pennock | 318/678 |
| 5,150,346 | 9/1992 | Minakuchi | 369/44 |

*Primary Examiner*—William M. Shoop, Jr.
*Assistant Examiner*—Karen Masih
*Attorney, Agent, or Firm*—David B. Harrison

[57] ABSTRACT

Method and apparatus for retracting an actuator comprising determining back emf voltage generated by the actuator motor; applying the determined voltage to a capacitor-resistor network; applying a holding voltage to the capacitor-resistor network. The application of the determined voltage and the holding voltage together charges a capacitor in the capacitor-resistor network to develop a charged capacitor voltage. The method and apparatus further comprises terminating application of the determined voltage to the capacitor-resistor network upon charging of the capacitor, and discharging the capacitor through the capacitor-resistor network to provide a forcing voltage to the actuator for retract operation. The forcing voltage initially forces a high deceleration current in the actuator. Further, the forcing voltage decays with time to a predetermined holding voltage to complete the retract operation.

10 Claims, 5 Drawing Sheets

ACTUATOR RETRACTION CIRCUIT

BACKGROUND OF THE INVENTION

Magnetic media drives, such as disk drives, have heads mounted on actuator arms that are cushioned on an air bearing surface during normal operation. When a drive's head actuator assembly is in a read/write position it does not make contact with the media surface because of the air bearing. When boundary condition events occur, such as, a power down, a sudden power loss, a spindown, or a system generated retract command, the heads must be moved to a landing zone to protect data integrity because air bearing loss is imminent. Any contact between head and media over the data zone has the potential of damaging the media surface, the head, or causing localized media demagnetization due to impact forces.

Also head and disk contact could generate debris within the head-disk assembly (HDA) reducing head and disk interface reliability, eventually causing head crashes and data loss. The most stringent boundary conditions, such as power loss, result in spindown where normal drive power becomes unavailable to a disk drive. When that happens, the rectified back emf of the spindle motor must supply the necessary power to move the heads to a "landing" zone on the media's surface suitable for head and disk contact. This function of moving heads to a safe zone is generally referred to as "retract" or "park".

Further, the spindle generated back emf is proportional to spindle speed and upon loss of power the spindle speed decreases rapidly causing the spindle generated back emf to drop rapidly as well. Hence the spindle has only finite amount of stored energy. A retract circuit has an operating voltage range and hence the actuator must complete retract before the spindle generated back emf voltage drops below the range. Therefore, there exists a time limit on the retract duration because the entire retract operation has to be completed before the operating range drop-out voltage is reached.

In the case of a magnetic disk, the landing zone is a highly polished area of a disk where no data is stored. The landing zone is provided so that a head can be parked there, i.e., the head actuator assembly can actually make contact with the disk surface without causing damage either to the data stored on the magnetic media, or to the media, or to the head itself.

Further, two crash stops, an inner crash stop and an outer crash stop are also provided to prevent head actuator assemblies from flying off the disk surface if the disk drive actuator/servo electronics loses control. One of these crash stops is used to locate the landing zone. During high velocity seeks, especially near the crash stops, a boundary condition event will cause loss of normal control. Unless attenuated, the high actuator velocity will cause a high force impulse contact with a crash stop. This sudden deceleration, could cause heads to twist on their flexure arms, overcome the air bearing, and subsequently make debris while generating disk contact. Hence there is a need for a solution that minimizes potential data loss, and head/media damage resulting from a head actuator assembly impacting crash stops at high velocities for boundary condition events.

Three prior art methods are known for controlling impact velocity while moving the head actuator assembly to a landing zone. One such method uses a unipolar fixed voltage, sourced from single quadrant circuitry capable of only sourcing current. This unipolar fixed voltage is applied to an actuator's coil to move the actuator assembly over to the landing zone. However, this method has its drawbacks. During a high velocity seek, when the actuator is moving at a high velocity towards the landing zone, an actuator's velocity cannot be reduced by this fixed voltage technique because the circuitry cannot sink current. Also, when the actuator is moving at high velocity away from the landing zone, velocity attenuation capability is severely limited by the circuit's high source resistance. Therefore, this fixed voltage method doesn't provide adequate high velocity attenuation and subsequent impact protection.

The second method, known as dynamic braking, also uses a unipolar fixed voltage, but it is supplied by two quadrant circuitry capable of both sourcing and sinking current. Again a unipolar fixed voltage is applied to an actuator's coil to move the actuator assembly over to the landing zone. During a high velocity seek, moving in either direction, the two quadrant circuit effectively provides a very low impedance path between the coil terminals. The coil back emf generates a current through this path that attenuates actuator velocity. However, the prime drawback is that attenuation is limited by the actuator's back emf voltage and circuit resistances. Therefore, although the actuator is dynamically braked, it is not enough to provide adequate impact protection. This is especially apparent when a high velocity seek occurs near a crash stop. Further, using this method requires longer crash stop zones to allow more deceleration distance, thereby reducing disk data storage capacity.

The third prior art method uses a back-emf feedback velocity control loop to regulate the impact velocity. This method requires a closed loop control system which is unnecessarily complex and poses some risk. The risk involves matching loop compensation parameters with high tolerance, high temperature variant circuit components. This presents a closed loop stability problem. Attempts to improve stability margins by detuning the control loop results in poor velocity control and subsequent poor retract performance.

Hence, there is a need for a mechanism for quick retraction of an actuator from a read/write position to a landing zone, with significant reduction in crash stop impact velocities, and in a controlled manner, during power down, or power loss, or spindown, or a system retract command. Further, there is a need for a retraction mechanism that overcomes prior art problems of control loop stability, poor actuator velocity control, poor dynamic braking capabilities and inadequate high velocity impact protection.

SUMMARY OF THE INVENTION

The present invention is an apparatus and method for retracting an actuator upon the occurrence of a boundary condition event, such as, a power down, a sudden power loss, a spindown or a system generated retract command.

An object of the invention is to provide a high initial forcing voltage during retract operation in order to rapidly decelerate an actuator.

Another object of the invention is to move an actuator to a landing zone of a storage medium upon the occurrence of a boundary condition event.

Yet another object of the invention is to move the actuator quickly, within a finite period of time, to the landing zone of a storage medium upon the occurrence of a boundary condition event.

Yet, another object of the invention is to minimize the force with which an actuator impacts crash stops on a storage medium upon the occurrence of a boundary condition event.

These and other objects are attained, in a broad sense, through the use of the method for retracting an actuator comprising the steps of determining back emf voltage generated by the actuator motor; applying the determined voltage to a capacitor-resistor network; applying a holding voltage to the capacitor-resistor network. The application of the determined voltage and the holding voltage together charges a capacitor in the capacitor-resistor network to develop a charged capacitor voltage. The method further comprises the steps of terminating application of the determined voltage to the capacitor-resistor network upon charging of the capacitor, and discharging the capacitor through the capacitor-resistor network to provide a forcing voltage to the actuator for retract operation. The forcing voltage initially forces a high deceleration current in the actuator. Further, the forcing voltage decays with time reaching a predetermined holding voltage for completion of the retract operation.

The aforementioned objects are also attained, in another sense, through the use of an actuator retraction circuit comprising a resistor-capacitor network. The retraction circuit further comprising a differential amplifier for determining back emf voltage generated by the actuator motor and for applying the determined voltage to a capacitor-resistor network. The retraction circuit also comprises a holding voltage generator for applying a holding voltage to the capacitor-resistor network. The application of the determined voltage and the holding voltage together charges a capacitor in the capacitor-resistor network to develop a charged capacitor voltage. Further, the capacitor discharges through the capacitor-resistor network to provide a forcing voltage to the actuator for retract operation; the forcing voltage initially forcing a high deceleration current in the actuator, and the capacitor voltage decaying with time reaching a predetermined fixed voltage for completion of retract operation.

It is an advantage of this invention that damage to either the media surface or the head from head and media contact over the data zone of the media is eliminated by moving the head/actuator assembly to the landing zone during retract.

It is another advantage of this invention that it provides excellent high velocity impact protection. Any head or media damage, resulting from a head/actuator assembly impacting crash stops at high velocities for boundary condition events, is eliminated.

It is yet another advantage of this invention that prior art problem of actuator control loop stability is eliminated.

It is another advantage of this invention that excellent actuator velocity control and dynamic braking capability is provided.

The foregoing and additional objects, features and advantages of the present invention will become apparent to those skilled in the art from a more detailed consideration of the preferred embodiment thereof, taken in conjunction with the accompanying drawings.

DETAILED DESCRIPTION OF THE INVENTION

Figure 1:
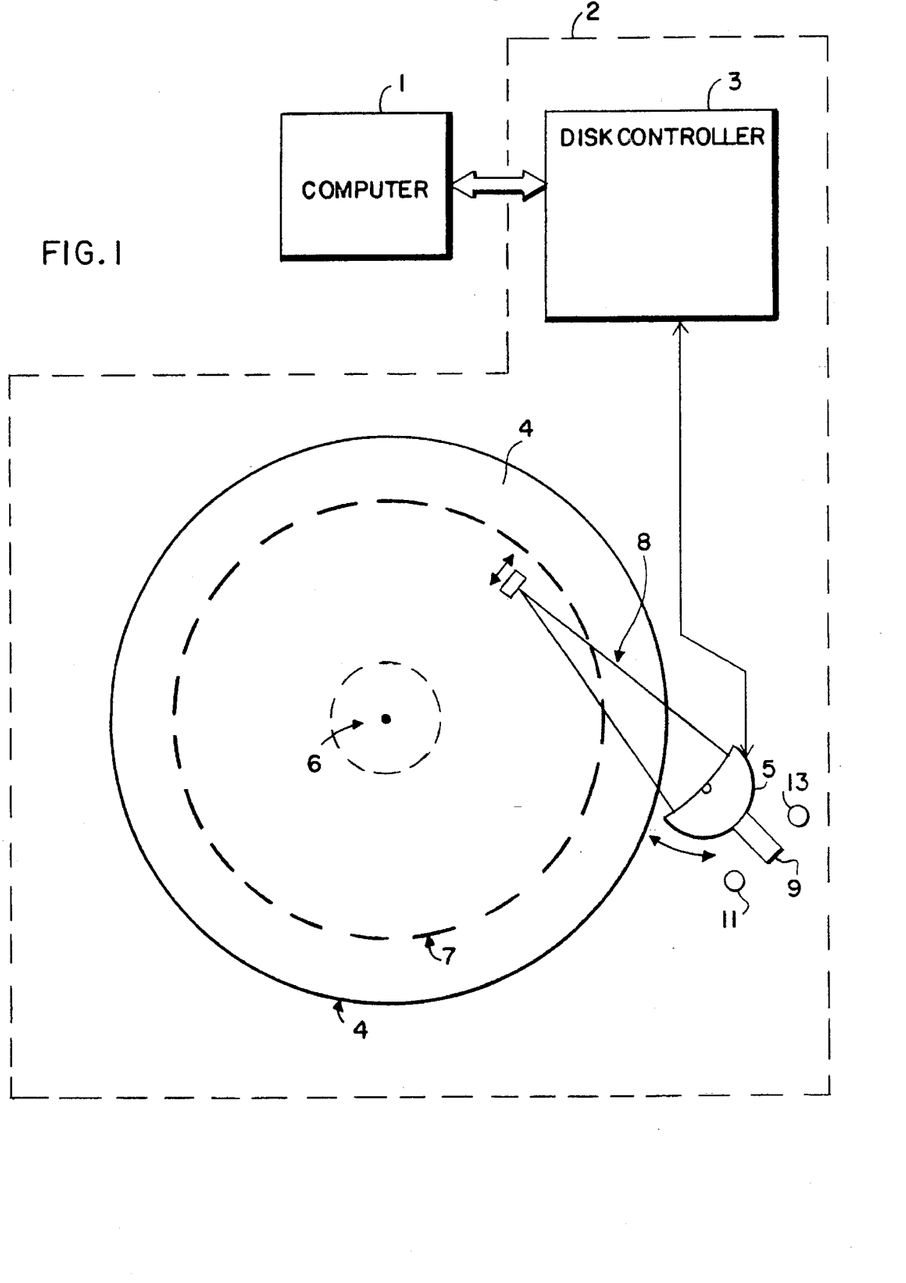
FIG. 1 is a schematic of a computer system connected to a disk drive that incorporates retracting an actuator according to the principles of the invention.

Shown in FIG. 1, is a computer system 1 connected to a disk drive 2. The disk drive 2 incorporates a disk controller 3 connected to actuator motor 5 that drives head-actuator assembly 8. As shown in FIG. 1, disk drive 2 also incorporates two crash stops, outer crash stop 11 and inner crash stop 13, and a tab 9 attached to the head-actuator assembly 8 for contacting the crash stops 11 and 13. Outer crash stop 11 and inner crash stop 13 are provided to prevent head-actuator assembly 8 from flying off the disk 4 surface if the disk drive actuator/servo electronics loses control. Inner crash stop 13 is used to locate the landing zone 6, while outer crash stop 11 locates the outer edge of disk 4. Also shown in FIG. 1 is a disk 4 having tracks 7 and landing zone 6.

Figure 2:
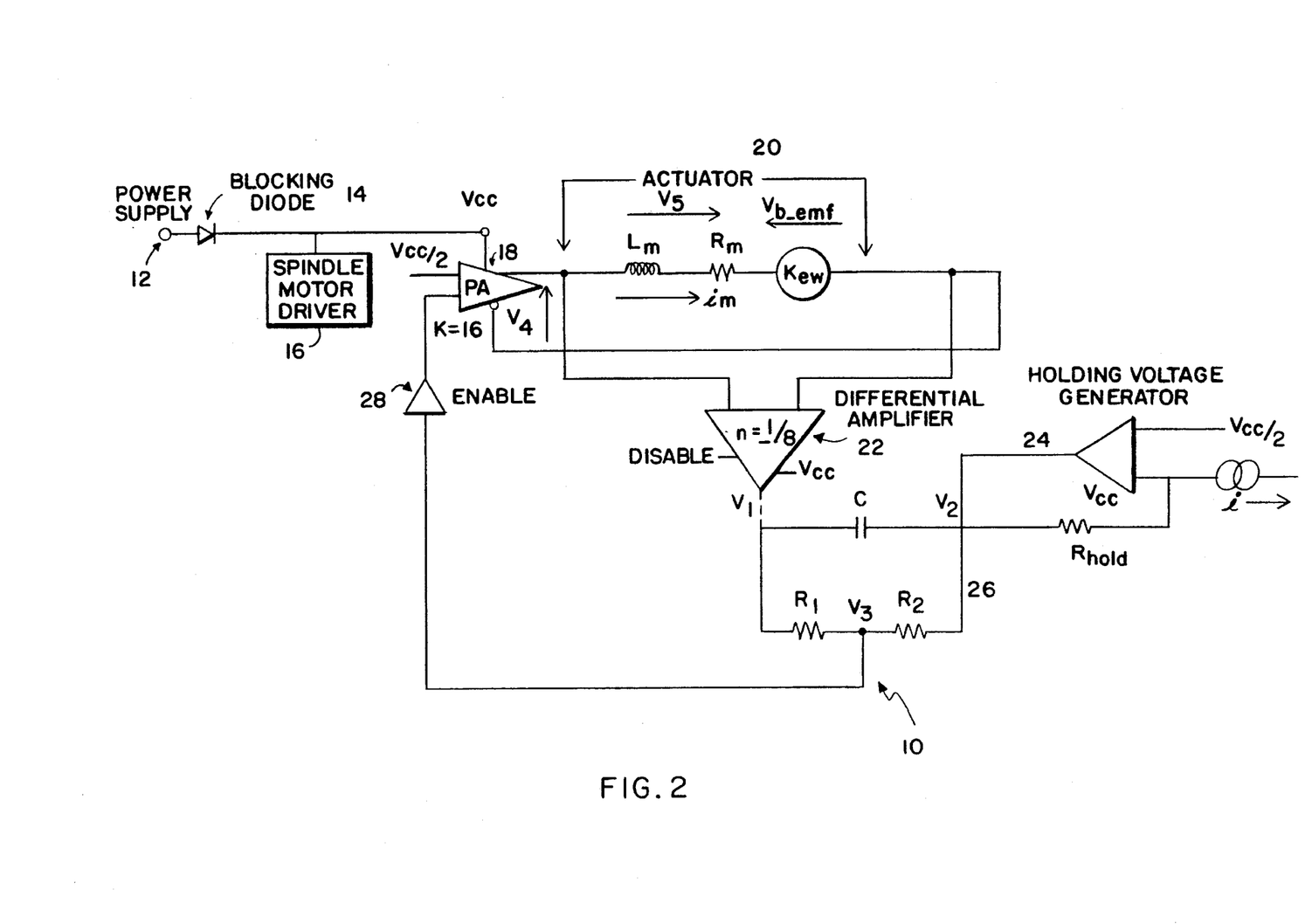
FIG. 2 is a schematic of an actuator retraction circuit according to the principles of the invention.

There is illustrated in FIG. 2 an actuator retraction circuit generally indicated at 10 which incorporates actuator motor/coil circuit 20, a differential amplifier 22, holding voltage generator circuit 24, and a RC circuit 26. Also shown in FIG. 2 is a power supply 12, a blocking diode 14, a power amplifier 18, and a spindle motor/driver 16. The actuator retraction circuit of FIG. 2 is generally incorporated within the disk controller 3 of FIG. 1.

As shown in FIG. 2, the actuator motor 5 of FIG. 1, is represented by actuator circuit 20. The actuator motor/coil circuit 20 incorporates an inductive component $L_M$, a resistive component $R_M$, and voltage generator $V_{b\_emf}$. As shown, the voltage generator $V_{b\_emf}$ represents the back emf generated by the actuator motor and is equal to $k_e\omega$, where $k_e$ is the actuator motor constant, and $\omega$ is actuator motor angular velocity. During normal operation of the disk drive, the power amplifier 18 controls the operation of the actuator. As shown in FIG. 2, the power amplifier 18 draws power from power supply 12 through blocking diode 14. Further, the power supply 12 also supplies power to the spindle motor 16.

When a boundary condition event such as a sudden loss of power supply voltage 12 occurs, the spindle motor/driver 16 generated back emf voltage (denoted by $V_{cc}$) is supplied to the power amplifier 18 for the operation of the actuator retraction circuit 10. The blocking diode 14 stops or blocks the spindle generated back emf $V_{cc}$ from sourcing current to outside circuitry by isolating the spindle motor 16 and power amplifier 18 from the power supply 12. As shown in FIG. 2, the spindle motor 16 generated voltage $V_{cc}$ supplies power for the retract operation.

Further, during normal operation of a disk drive, while the actuator/head assembly moves around at high velocities seeking the desired track or is positioned on track without any velocity, there exists actuator coil current $i_m$ flowing in the actuator circuit 20 from the power amplifier 18, as shown in FIG. 2. When a boundary condition event occurs, a retract operation is performed to park the heads in the safe landing zone of its associated disk. According to the principles of the invention, during retract operation, the back emf voltage $V_{b\_emf}$ has to be sensed in the actuator circuit 20, as shown in FIG. 2. In order to accurately sense the actuator back emf voltage $V_{b\_emf}$, the current $i_m$ is allowed to go to zero. This is accomplished by first shutting-off the power amplifier 18 to induce flyback. The inductive component $L_M$ of the actuator motor circuit allows a reverse voltage to develop in the actuator circuit that gets clamped by the flyback clamp circuitry located within the power amplifier 18 through inductive flyback, causing actuator current $i_m$ to go to zero.

As shown in FIG. 2, the differential amplifier 22 upon sensing the completion of flyback or if $i_m$ is nominally zero, samples the back emf voltage across its input pins by measuring the voltage across $L_M$, $R_m$, and $k_e\omega$ of actuator circuit 20. Since, actuator current $i_m$ is zero, the voltage across $L_M$, and $R_m$ is zero. Therefore, differential amplifier 22 primarily measures $k_e\omega$, the back emf voltage $V_{b\_emf}$. Further, differential amplifier 22 also inverts and scales the sampled voltage by a pre-determined factor and applies the resultant voltage $V_1$ to the resistor-capacitor RC circuit 26. The differential amplifier 22 scales the sampled voltage to ensure that the circuit doesn't go out of range. Voltage $V_1$ can be represented by the following equation:

$$V_1 = -\left(\frac{K_e w}{n}\right) + \frac{V_{cc}}{2}$$

where, $k_e\omega$ is the sampled back emf voltage $V_{b\_emf}$, n is the scaling factor of the differential amplifier 22, and $V_{cc}$ is the voltage generated by the spindle motor/driver 16. As shown in FIG. 2, good results have been obtained by scaling the sampled back emf voltage by a factor of n= 8.

Further, the holding voltage generator circuit 24, generates voltage $V_2$. The voltage $V_2$ can be represented by the following equation:

$$V_2 = \frac{V_{cc}}{2} + R_{hold}i$$

where ($R_{hold}*i$) represents the holding voltage component of voltage $V_2$, $R_{hold}$ being a scaling resistor, and i a fixed current source.

Referring to FIG. 2, voltage $V_2$ is also applied to RC circuit/network 26. As shown, capacitor C in RC circuit 26 gets charged by the application of voltage $V_1$ from differential amplifier 22 and by the application of holding voltage $V_2$. Once capacitor C is charged the differential amplifier 22 is disabled and is isolated from RC circuit/network 26, thereby terminating the application of voltage $V_1$ to the RC network 26.

Further, the charged capacitor voltage, which is equal to $V_1-V_2$, is scaled and together with the holding voltage $V_2$ is dynamically applied across the actuator coil via the power amplifier 18. As shown, the RC circuit 26 has two resistors $R_1$ and $R_2$ connected in series. The resistors $R_1$ and $R_2$ are selected to suitably scale the voltage $V_3$ that is applied through buffer 28 back to the power amplifier 18. Buffer 28 has high input impedance and hence doesn't load the RC circuit 26.

As shown in FIG. 2, voltage $V_3$ is dynamically applied to the power amplifier 18 to enable it to drive the actuator to the safe landing area of a disk, i.e., to park the head actuator assembly. After the occurrence of a boundary condition, once capacitor C has been charged, it discharges exponentially with a time constant, $t_D=(R_1+R_2)C$. The capacitor voltage and the holding voltage $V_2$ combine to the voltage $V_3$ that is dynamically applied through buffer 28 back to the power amplifier 18. Voltage $V_3$ can be represented by the following equation:

$$V_3 = -\left(\frac{\frac{k_e w}{n} R_2 \exp^{-\frac{t}{t_D}}}{R_1 + R_2}\right) + \frac{V_{cc}}{2} + R_{hold}i$$

where, $R_{hold}$ is a scaling resistor, i is a fixed current source; $R_1$ and $R_2$ are scaling resistors of the RC circuit 26; t is the time since the occurrence of the boundary event requiring retract and the sampling of back emf voltage $V_{b\_emf}$; and $t_D$ is the time constant of the RC circuit 26 and is equal to $(R_1+R_2)C$. Further, as shown in FIG. 2, the power amplifier 18 scales and offsets voltage $V_3$ suitably to ensure that the initial voltage applied to the actuator circuit 20 reinforces the back emf voltage $V_{b\_emf}$ existing in actuator circuit 20. The voltage $V_4$ that is applied to the actuator circuit by the power amplifier 18 is given by the following equation:

$$V_4 = -K\left(\frac{\frac{k_e w}{n} R_2 \exp^{-\frac{t}{t_D}}}{R_1 + R_2}\right) + KR_{hold}i =$$

$$-K\left(\frac{\frac{k_e w}{n} R_2 \exp^{-\frac{t}{t_D}}}{R_1 + R_2}\right) + V_{hold}$$

where, K is the gain of the power amplifier 18 and $KR_{hold}i$ represents the holding voltage, $V_{hold}$.

Referring to FIG. 2, the application of voltage $V_4$ to actuator circuit 20 in combination with back emf voltage $V_{b\_emf}$ results in forcing voltage $V_5$ across inductive component $L_M$ and resistive component $R_M$ of actuator circuit 20. The forcing voltage $V_5$ is given by the following equation:

$$V_5 = k_e w - V_4 = k_e w\left[1 + KR_2\frac{\exp^{-\frac{t}{t_D}}}{n(R_1+R_2)}\right] - KR_{hold}i$$

or, $$V_5 = k_e w\left[1 + KR_2\frac{\exp^{-\frac{t}{t_D}}}{n(R_1+R_2)}\right] - V_{hold}$$

As shown in FIG. 2, good results were obtained by using an actuator retraction circuit 10 having the following parameters:

scaling resistor $R_1$=2 Kohms;

scaling resistor $R_2$=10 Kohms;

scaling resistor $R_{hold}$=619 ohms, fixed current source i=100 microAmps;

time constant of the RC circuit $t_D$=5.64 millisec;

power amplifier gain K=16; and differential amplifier gain n=8.

Further, during retract, the forcing voltage $V_5$ causes a current $i_m$ to flow in the actuator motor/coil circuit 20 thereby creating a force in the actuator coil. The force in the actuator coil attenuates any actuator velocity that may exist prior to retract, thereby enabling the head/actuator assembly to decelerate suitably before contacting the crash stop while parking the actuator in landing zone. In the landing zone there is a mechanical latch that captures the actuator to keep it in the landing zone. Further, if prior to retract the actuator has no velocity, forcing voltage $V_5$ allows the actuator/head assembly to accelerate towards the safe landing zone of the disk prior to parking.

Figure 3:
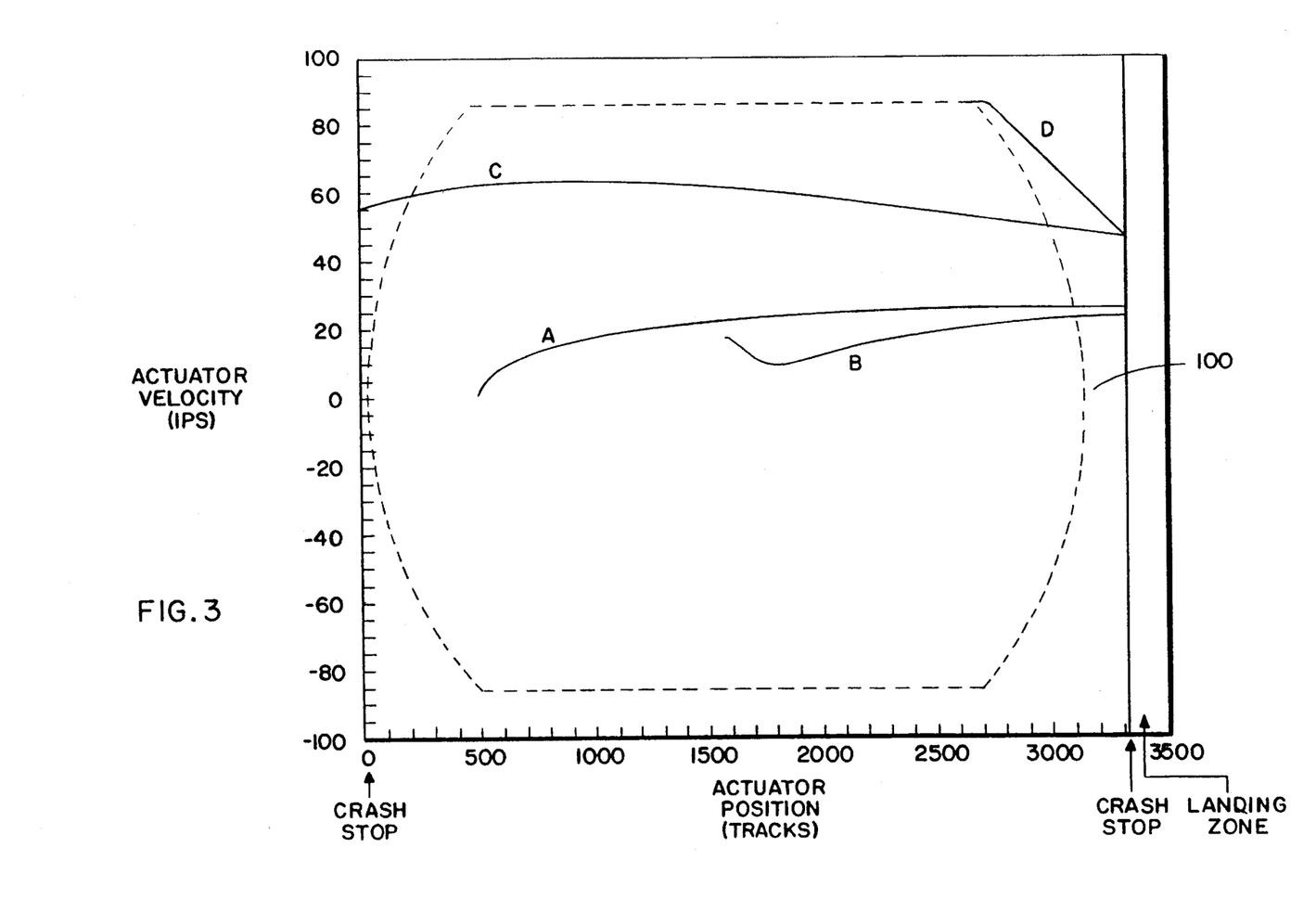
FIG. 3 is a actuator motion phase plane indicating various trajectories of actuator motion in response to a retract operation performed by the actuator retraction circuit of FIG. 2.

Shown in FIG. 3, is a actuator motion phase plane indicating various trajectories of actuator motion in response to a retract operation performed by the actuator retraction circuit of FIG. 2. As shown, the horizontal axis of the phase plane of FIG. 3 represents actuator position using track numbers; track number 0 representing the outermost track on a disk and the location of outer crash stop 11, and track number 3300 representing the landing zone 6 and inner crash stop 13. Also as shown, the vertical axis represents actuator velocity; a positive velocity indicating actuator motion towards the landing zone and a negative velocity indicating actuator motion away from the landing zone and towards the outer edge of a disk.

As shown in FIG. 3, the area 100 in the actuator motion phase plane denotes the different velocities and track positions that an actuator may have just prior to retract. The position of the actuator and its velocity prior to retract determines the trajectory the actuator is forced to follow by the forcing voltage $V_5$ during retract. Further, the location and position of the actuator prior to retract determines the time available for the actuator retraction circuit of FIG. 2 to complete the retract operation by moving the actuator to the landing zone. The location and position of the actuator prior to retract also determines the velocity with which the inner crash stop is impacted.

As shown in FIG. 3, trajectory D represents actuator motion during retract in response to forcing voltage $V_5$, in the event that the actuator velocity prior to retract is high and the actuator is positioned close to the landing zone. As shown, capacitor C has very little time to discharge and the terminal velocity of the actuator upon completion of retract is determined by $V_{hold}$, the residual capacitor voltage, and the actuator momentum prior to retract.

Figures 4, 7:
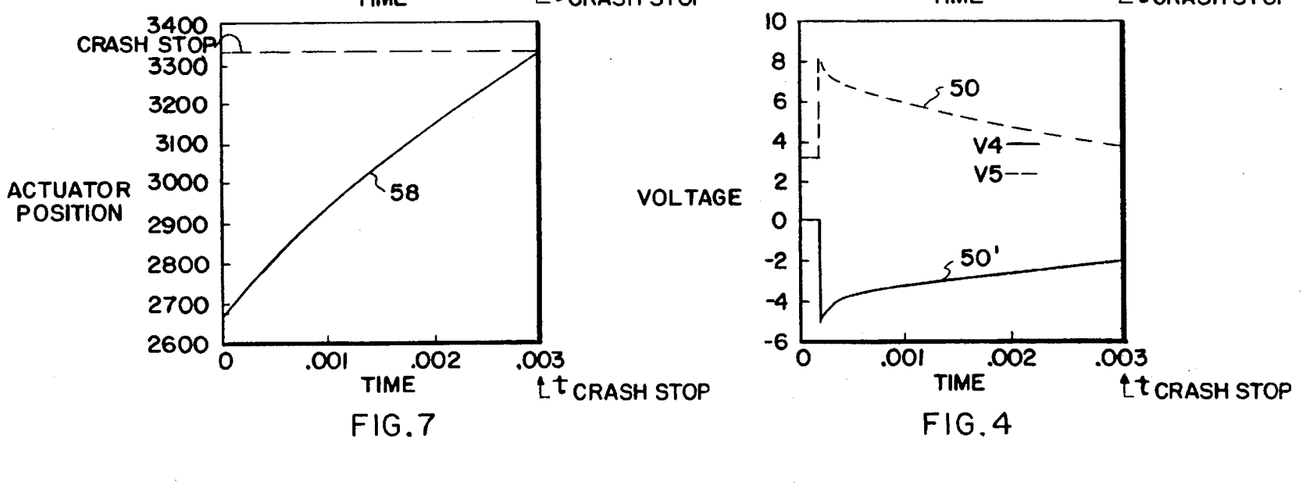
FIG. 4 is a graphical representation of the variations of actuator retraction voltage with time in the actuator retraction circuit of FIG. 2.
FIG. 7 is a graphical representation of actuator position with time during retract.
Figures 5, 6:
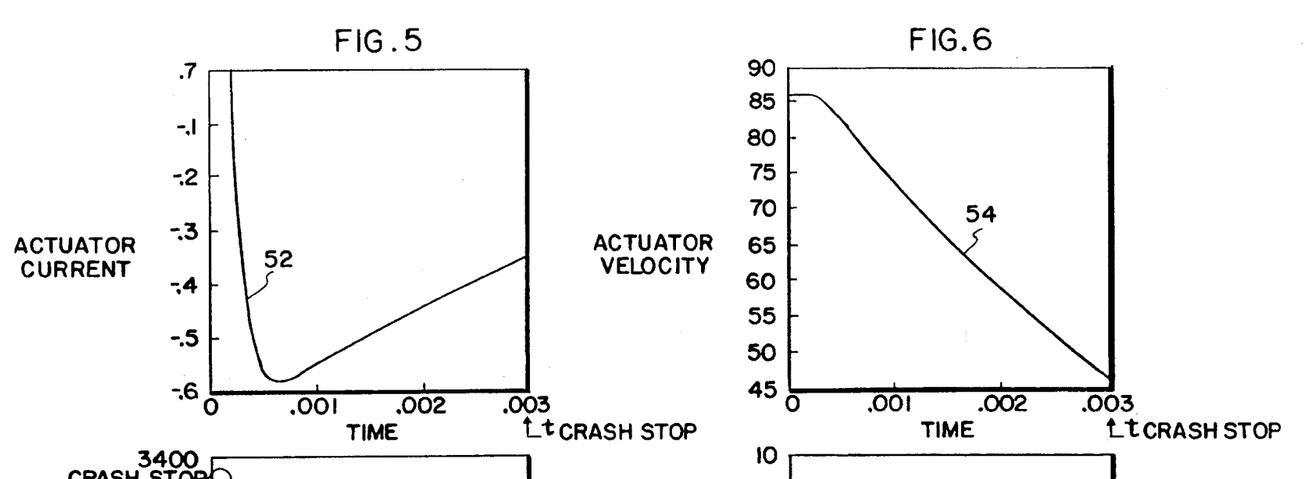
FIG. 5 is a graphical representation of the variations of deceleration current time in the actuator retraction circuit of FIG. 2.
FIG. 6 is a graphical representation of the variations of actuator velocity with time in the actuator retraction circuit of FIG. 2.

Referring now to FIG. 4, curve 50 represents the variation of forcing voltage $V_5$ with time during retract when the actuator velocity prior to retract is high and the actuator is positioned close to the landing zone. After the occurrence of a boundary condition requiring retract and after $i_m$ has been forced to zero, i.e., at time t=0, the forcing voltage $V_5$, that is applied to the actuator coils is given by:

$$V_5 = k_e w \left[ 1 + KR_2 \frac{\exp{-\frac{0}{tD}}}{n(R_1 + R_2)} \right] - V_{hold} = k_e w \left[ 1 + K \frac{R_2}{n(R_1 + R_2)} \right] - V_{hold}$$

where, K is the gain of the power amplifier 18. As shown in FIG. 4 and the above equation, magnitude of forcing voltage $V_5$, is large at time t=0.0002s (i.e. at t=0 approximately). The high initial forcing voltage $V_5$ creates a high deceleration current in the actuator circuit causing the actuator to slow down rapidly. Referring to FIG. 5, curve 52 which represents the variation of deceleration current with time, shows the high deceleration current experienced by the actuator over the period t=0 to t=0.002s.

Using the aforementioned retraction circuit parameters, the forcing voltage $V_5$ at t=0.0s is given by:

$$V_5 = k_e w [1 + 1.667] - V_{hold} = 2.667(k_e w) - V_{hold}$$

The 2.667*$k_e\omega$ component of forcing voltage $V_5$ causes the forcing voltage $V_5$ to be very high initially relative to the back emf voltage $V_{b\_emf}(=k_e\omega)$, resulting in a high deceleration current $i_m$ to be applied to the actuator coils, as shown by curve 52 in FIG. 5. The deceleration current $i_m$ in the actuator motor/coil circuit 20 is forced by the combination of the power amplifier output voltage $V_4$ and the actuator motor/coil circuit back emf voltage $V_{b\_emf}$. The forcing voltage $V_5$ by design is a multiple of the sampled back emf voltage $V_{b\_emf}$. As shown above, the embodiment of FIG. 2 uses a multiple of 2.667 of the sampled back emf voltage $V_{b\_emf}$ or $k_e\omega$ to provide the forcing voltage $V_5$.

Further, referring to FIG. 6, as shown by curve 54, rapid deceleration is experienced by the actuator due to the high deceleration current in the actuator circuit and the actuator is decelerated sufficiently thereby contacting the inner crash stop at a much lower velocity as it reaches the landing zone. Further, referring to FIGS. 5 and 6, between t=0 and t=0.001s the slope of actuator velocity curve 54 is steepest while actuator deceleration current attains its peak value. The high actuator deceleration current flowing through the actuator motor/coil circuit causes rapid deceleration of actuator velocity as indicated by the high gradient of curve 54 in FIG. 6, between t=0 and t=0.003s.

Referring now to FIG. 7, curve 58 indicates actuator position on disk with respect to time during retract operation. As shown in FIG. 7 and by trajectory D of the phase plane of FIG. 2, the actuator is positioned on a track close to the inner crash stop at the start of retract at t=0. As shown, the actuator is moved towards the inner crash stop in the landing zone quickly and in a controlled manner during retract. Further, as shown in FIG. 7, the actuator makes contact with the crash stop at time t=$t_{crash\_stop}$. As shown in FIGS. 4, 5, 6, and 7, upon completion of retract at time t=$t_{crash\_stop}$, the actuator makes contact with the crash stop in the safe landing zone of the storage media at a low velocity and with low impact force.

As shown in FIG. 3, trajectory C represents actuator motion during retract in response to forcing voltage $V_5$, in the event that the actuator is close to the outer crash stop and is moving towards it at a very high velocity. Further, as shown in FIGS. 8, 9, 10 and 11, in the event that, the actuator is close to the outer crash stop and is moving towards it at a very high velocity, the forcing voltage $V_5$ decelerates the actuator significantly as it impacts the outer crash stop. Further as shown, the actuator velocity is reversed upon impact causing the actuator to move towards the landing zone. However, the actuator velocity is still very high for inner crash stop impact for parking at the landing zone. Therefore, the forcing voltage $V_5$ further decelerates the actuator as the actuator attains a lower fixed voltage before impacting the inner crash stop. The actuator motion as discussed above is represented by trajectory C of the actuator phase plane of FIG. 3.

Figures 9, 11:
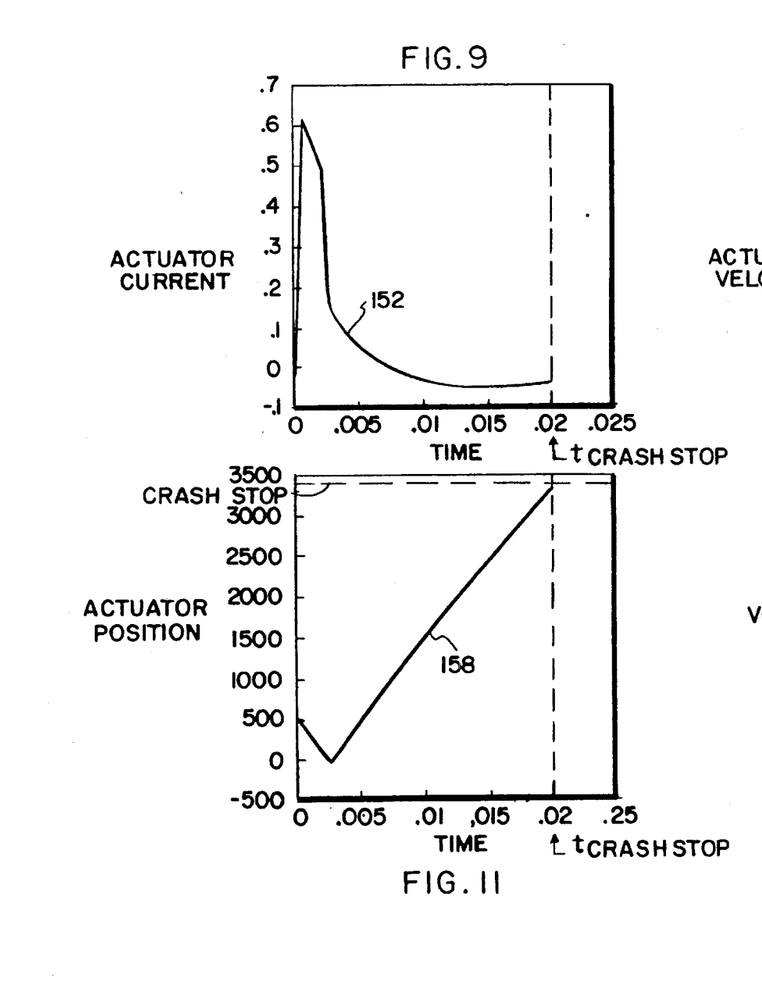
FIG. 9 is another graphical representation of the variations of deceleration current time in the actuator retraction circuit of FIG. 2.
FIG. 11 is another graphical representation of actuator position with time during retract.
Figure 10:
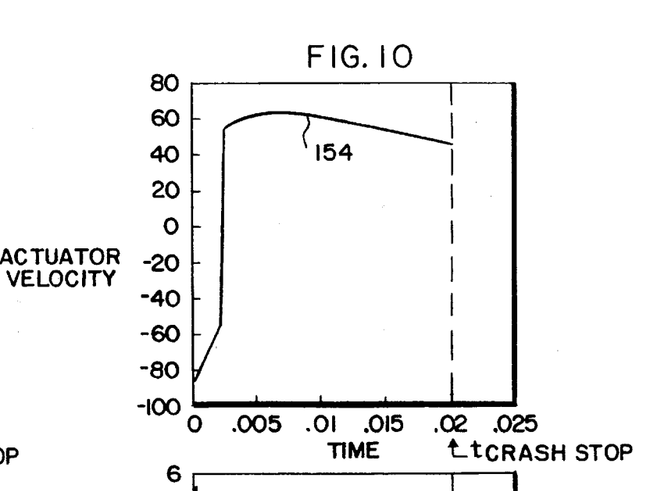
FIG. 10 is another graphical representation of the variations of actuator velocity with time in the actuator retraction circuit of FIG. 2.

Further, referring to FIG. 10, as shown by curve 154, rapid deceleration is experienced by the actuator initially due to the high deceleration current in the actuator circuit, and following impact with the outer crash stop the actuator velocity is slowly decelerated to reach a final steady voltage as it reaches the landing zone. Further, referring to FIGS. 9 and 10, between t=0 and t=0.02s the high actuator deceleration current flowing through the actuator motor/coil circuit causes rapid deceleration of actuator velocity before the outer crash stop is impacted, as indicated by the high gradient of curve 154 between t=0 and t=0.02s.

Figure 8:
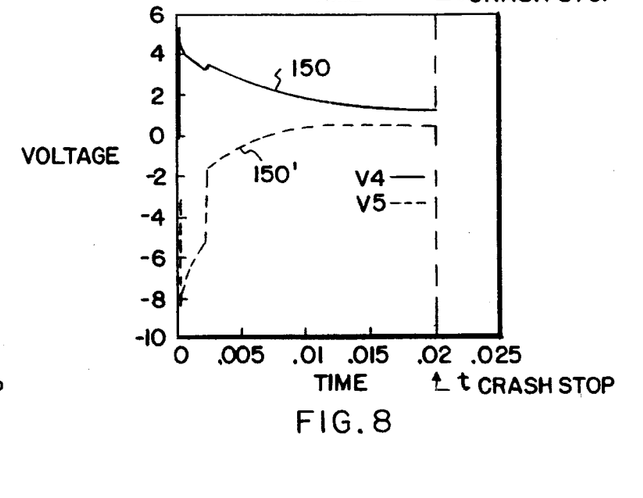
FIG. 8 is another graphical representation of the variations of actuator retraction voltage with time in the actuator retraction circuit of FIG. 2.

Further, as shown by curve 150' in FIG. 8, after the outer crash stop has been impacted and the direction of actuator motion has been reversed, i.e., after t=0.02s, forcing voltage $V_5$ continues to force the actuator to decelerate. As shown by curve 150 in FIG. 8, voltage $V_4$ decays towards the holding voltage $V_{hold}$, thereby causing holding voltage $V_5$ (represented by curve 150' in FIG. 8) to decay towards zero. Also as shown, as voltages $V_4$ and $V_5$ decay the current in the actuator circuit also correspondingly decays. Once capacitor C has discharged, the predetermined fixed holding voltage component $V_{hold}$ forces the actuator to complete the retract operation with a slow velocity. At that point in time, at t=0.2 (i.e., $t/t_D = \infty$), forcing voltage $V_5$, that is applied to the actuator coil is given by:

$$V_5 = k_e w \left[ 1 + KR_2 \frac{\exp^{-\frac{\infty}{t_D}}}{n(R_1+R_2)} \right] - V_{hold} = k_e w - V_{hold}$$

where, K is the gain of the power amplifier 18. As shown, forcing voltage $V_5$ decays towards zero as the actuator generated back emf voltage $k_e \omega$ counters holding voltage component $V_{hold}$. As the forcing voltage $V_5$ decays to zero, i.e., as voltage $V_4$ decays towards holding voltage component $V_{hold}$, the actuator completes the retract operation with a slow velocity.

Referring now to FIG. 11, curve 158 indicates actuator position on disk with respect to time during retract operation. In FIG. 11 and in trajectory D of the phase plane of FIG. 2, the actuator is shown positioned on a track close to the outer crash stop at the start of retract at t=0. As shown, the actuator is first rapidly decelerated as it impacts the outer crash stop and after having reversed its direction the actuator is moved towards the inner crash stop in the landing zone quickly and in a controlled manner during retract. Further, as shown in FIG. 11, the actuator makes contact with the crash stop at time t=$t_{crash\_stop}$. As shown in FIGS. 8, 9, 10, and 11, upon completion of retract at time t=$t_{crash\_stop}$, the actuator makes contact with the crash stop in the safe landing zone of the storage media at a low velocity and with low impact force.

Further, referring to FIG. 3, as indicated by trajectory A, in the event that the actuator has very low velocity or zero velocity prior to retract, the predetermined fixed holding voltage component $V_{hold}$ of forcing voltage $V_5$ forces the actuator to slowly accelerate and complete the retract operation with a low velocity as the actuator contacts the inner crash stop and is parked in the landing zone.

For example, prior to the occurrence of a boundary condition, the actuator/head assembly of a disk drive may not be performing high velocity seeks. The actuator/head assembly may simply be positioned on-track over a disk. If a boundary condition event occurs while the actuator/head assembly is idling while positioned on-track or track following, the angular velocity $\omega$ of the actuator is zero. Therefore, there is no back emf voltage to sense, because $k_e \omega$ is also zero. The forcing voltage $V_5$, that initially is applied to the actuator circuit is given by:

$$V_5 = k_e 0 \left[ 1 + KR_2 \frac{\exp^{-\frac{t}{t_D}}}{n(R_1+R_2)} \right] - V_{hold} = -V_{hold}$$

where, K is the gain of the power amplifier 18, and the angular velocity $\omega$ of the actuator being zero. Therefore, if prior to retract the actuator has no velocity or very low velocity, forcing voltage $V_5$ forces the actuator/head assembly to accelerate to a steady velocity as the actuator moves towards the safe landing zone of the disk and contacts the inner crash stop for parking, as indicated by trajectory A of FIG. 3.

Further, in the event that prior to retract, actuator velocity is neither too high nor too low, and/or the actuator is located far away from the landing zone, forcing voltage $V_5$ forces the actuator/head assembly to decelerate slowly. Capacitor C slowly discharges towards predetermined fixed holding voltage $V_{hold}$, forcing the actuator/head assembly to decelerate slowly and then attain a steady velocity as it moves towards the safe landing zone and contacts the crash stop, as indicated by trajectory B of FIG. 3.

While the invention has been particularly shown and described with reference to one embodiment thereof, it will be understood by those skilled in the art that various other changes in the form and details may be made therein without departing from the spirit and scope of the invention. The present disclosure is merely illustrative, the invention comprehending all variations thereof.

We claim:

1. A method for retracting an actuator comprising the steps of:

determining back emf voltage generated by an actuator;

charging a capacitor in a capacitor-resistor network by applying said determined voltage and a holding voltage to said capacitor-resistor network to develop a charged capacitor voltage;

discharging said charged capacitor through said capacitor-resistor network to provide a forcing voltage that decays with time to a predetermined fixed voltage, said predetermined fixed voltage being a function of said holding voltage; and applying said forcing voltage to said actuator to generate a high initial deceleration current in said actuator and to controllably retract said actuator.

2. The method of claim 1 wherein the step of determining back emf voltage generated by the actuator motor further comprises the steps of:

sensing the loss of power to actuator circuit;

allowing actuator coil current to decay to zero; and measuring back emf voltage generated by the actuator motor after actuator coil current has decayed to zero.

3. The method of claim 1 further comprising the step of terminating application of said determined voltage to said capacitor-resistor network upon charging of said capacitor to said charged capacitor voltage.

4. A method for retracting an actuator comprising the steps of:

determining back emf voltage generated by an actuator;

scaling said determined voltage;

charging a capacitor in a capacitor resistor network by applying said scaled voltage and a holding voltage to said capacitor-resistor network to develop a charged capacitor voltage;

discharging said charged capacitor voltage through said capacitor-resistor network;

combining said discharging charged capacitor voltage with said holding voltage to provide a forcing voltage that decays with time to a predetermined fixed voltage, said predetermined fixed voltage being a function of said holding voltage; and applying said forcing voltage to said actuator to generate a high initial deceleration current in said actuator and to controllably retract said actuator.

5. The method of claim 4 wherein the step of determining back emf voltage generated by the actuator motor further comprises the steps of:

sensing the loss of power to actuator circuit;

allowing actuator coil current to decay to zero; and measuring back emf voltage generated by the actuator motor after actuator coil current has decayed to zero.

6. The method of claim 4 further comprising the step terminating application of said scaled voltage to said capacitor-resistor network upon charging of said capacitor to said charged capacitor voltage.

7. A method for the open loop retraction of an actuator upon power loss, spindown, or upon system request comprising the steps of:

allowing actuator coil current to decay to zero through inductive flyback;

measuring actuator back emf voltage;

inverting and scaling said measured voltage;

applying a holding voltage to said capacitor-resistor network;

charging a capacitor in a resistor-capacitor network to develop a charged capacitor voltage by applying said inverted and scaled voltage to said resistor-capacitor network;

discharging said charged capacitor voltage through said capacitor-resistor network;

combining said discharging charged capacitor voltage with said holding voltage to provide a forcing voltage that decays with time to a predetermined fixed voltage, said predetermined fixed voltage being a function of said holding voltage; and applying said forcing voltage to said actuator to generate a high initial deceleration current in said actuator and to controllably retract said actuator.

8. The method of claim 7 further comprising the step terminating application of said inverted and scaled voltage to said capacitor-resistor network upon charging of said capacitor to said charged capacitor voltage.

9. A circuit for retracting an actuator comprising:

a resistor-capacitor network;

a differential amplifier for determining back emf voltage generated by the actuator motor; said amplifier applying said determined voltage to a capacitor-resistor network;

a holding voltage generator for applying a holding voltage to said capacitor-resistor network, application of said determined voltage and said holding voltage together charging a capacitor in said capacitor-resistor network to develop a charged capacitor voltage and said capacitor discharging said charged capacitor voltage through said capacitor-resistor network to provide a forcing voltage to said actuator for retract operation and said forcing voltage initially generating a high deceleration current in said actuator and said forcing voltage decaying with time to a predetermined fixed voltage to complete said retract operation.

10. A circuit for retracting an actuator comprising:

a resistor-capacitor network;

a differential amplifier for determining back emf voltage generated by the actuator motor; said amplifier applying said determined voltage to a capacitor-resistor network;

a holding voltage generator for applying a holding voltage to said capacitor-resistor network, application of said determined voltage and said holding voltage together charging a capacitor in said capacitor-resistor network to develop a charged capacitor voltage and said capacitor discharging said charged capacitor voltage through said capacitor-resistor network;

a power amplifier connected to said resistor capacitor network to receive said discharging charged capacitor voltage and to provide a forcing voltage to said actuator for retract operation, said forcing voltage initially generating a high deceleration current in said actuator and said forcing voltage decaying with time to a predetermined fixed voltage to complete said retract operation.

\* \* \* \* \*